H. R. PATRIARCHE.
ANTISKIDDING DEVICE.
APPLICATION FILED JAN. 4, 1919.
1,333,873.
Patented Mar. 16, 1920.
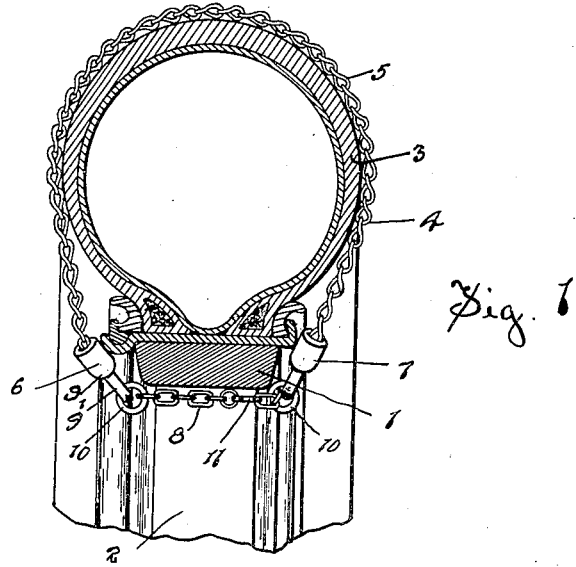
Fig. 1
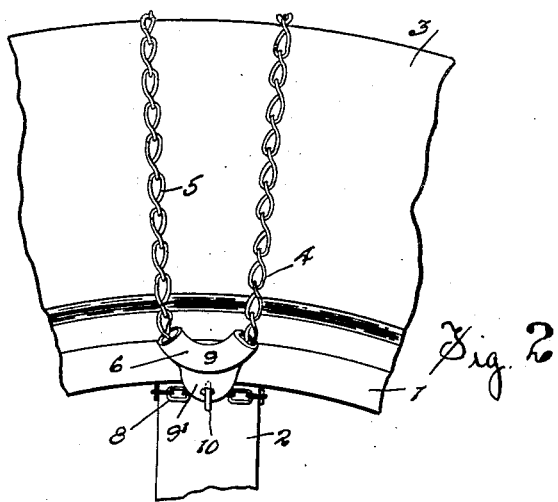
Fig. 2
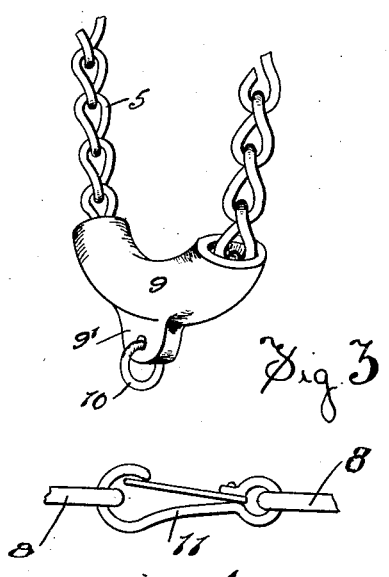
Fig. 3
Fig. 4
Fig. 5
Fig. 6
INVENTOR
H. R. Patriarche
BY
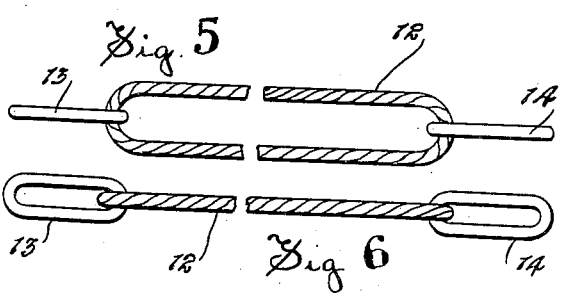

UNITED STATES PATENT OFFICE.

HUGH RACEY PATRIARCHE, OF WINNIPEG, MANITOBA, CANADA.

ANTISKIDDING DEVICE.

1,333,873.      Specification of Letters Patent.      Patented Mar. 16, 1920.

Application filed January 4, 1919. Serial No. 269,625.

*To all whom it may concern:*

Be it known that I, HUGH R. PATRIARCHE, of the city of Winnipeg, in the Province of Manitoba, Canada, have invented certain new and useful Improvements in Antiskidding Devices, of which the following is the specification.

The invention relates to improvements in anti-skidding devices for wheels and especially automobile or truck wheels and an object of the invention is to provide a device of this kind which can be quickly and easily applied on the wheel and removed therefrom whenever desired without in any way changing the construction of the wheel or marring or injuring the same.

A further object is to provide a series of independent cross chains or ropes grouped in pairs and each pair of which are arranged so that they can be readily attached to the spoke of the wheel, thereby making it possible to employ any number of them as occasion may demand.

A still further object of the invention is to construct the anti-skidding device such that the chain or rope utilized is in a continuous loop and the mountings therefore allow of the sliding of the chain or rope, thereby distributing the wear.

With the above objects in view the invention consists essentially in a continuous chain, rope or such like forming a closed loop, a pair of mountings slidably connected to the chain or such like and an attaching fastening for detachably connecting the mountings to the spoke of a wheel, the parts being arranged and constructed as hereinafter more particularly described and later pointed out in the appended claim, reference being had to the accompanying drawing in which:—

Figure 1 represents a vertical sectional view through a portion of an automobile wheel showing my anti-skidding device applied thereon.

Fig. 2 represents a side view of the parts as they appear in Fig. 1.

Fig. 3 is a perspective view of one of the mountings and showing a part of the chain passing therethrough.

Fig. 4 represents a detailed side view of the snap hook in the fastening chain.

Fig. 5 represents a plan view of a modified form of part of the anti-skidding device.

Fig. 6 represents a side view of the parts appearing in Fig. 5.

In the drawing like characters of reference indicate corresponding parts in the several figures.

1 represents the felly of an automobile wheel, 2 one of the spokes and 3 the automobile tire which is demountably mounted on the rim in the customary manner.

The anti-skid device is indicated generally by the reference numeral 4 and embodies a looped gripping member such as a continuous chain 5, two side mountings 6 and 7 and a fastening chain 8. The chain 5 is of such a length that when the loop is passed over the tire the ends of the loop lie more or less adjacent the rim of the wheel. On the chain loop the mountings 6 and 7 are placed and these each comprise a tubular U-shaped body 9 slidably receiving the chain. A lug 9' which carries a ring 10 is formed on the bowed portion of the U-shaped body 9. The fastening chain 8 is supplied with a snap hook 11 and is designed to be passed through the rings 10 and around the spoke of the wheel, completely encircling the spoke.

In actual practice when the looped chain 5 has been thrown across the tire the mountings are drawn in toward the rim of the wheel and the fastening chain is then passed through the rings and snapped, this completing the fastening of the anti-skidding device. When the fastening is completed the looped chain is drawn more or less tightly across the tire and the ends of the U-shaped mountings rest against the rim and accordingly resist any turning movement.

For ordinary road conditions any number of these devices, as wished, can be placed on the tire and in the manner shown in the drawing, where it will be seen that two strands cross the tire in each instance.

In Figs. 5 and 6 of the drawing I have shown a rope loop 12 instead of chain and flat end links 13 and 14 which are substituted for the side mountings 6 and 7. This is a much cheaper construction and has practically all the advantages of the other construction with the exception that it is not as durable.

What I claim as my invention is:—

In an anti-skidding device for automobile wheels, a chain in the form of a continuous loop and adapted to extend across the tread portion of the wheel with the ends of the loop lying adjacent the rim of the wheel, tubular mountings slidably mounted on the ends of the loop, rings attached to the mountings and a chain passing through the rings and around the spoke of the wheel.

Signed at Winnipeg, this 26 day of October, 1918.

HUGH RACEY PATRIARCHE.

In the presence of:—
G. L. ROXBURGH,
K. B. WAKEFIELD.